W. V. TURNER.
COMBINED AUTOMATIC AND STRAIGHT AIR BRAKE APPARATUS.
APPLICATION FILED SEPT. 18, 1906.

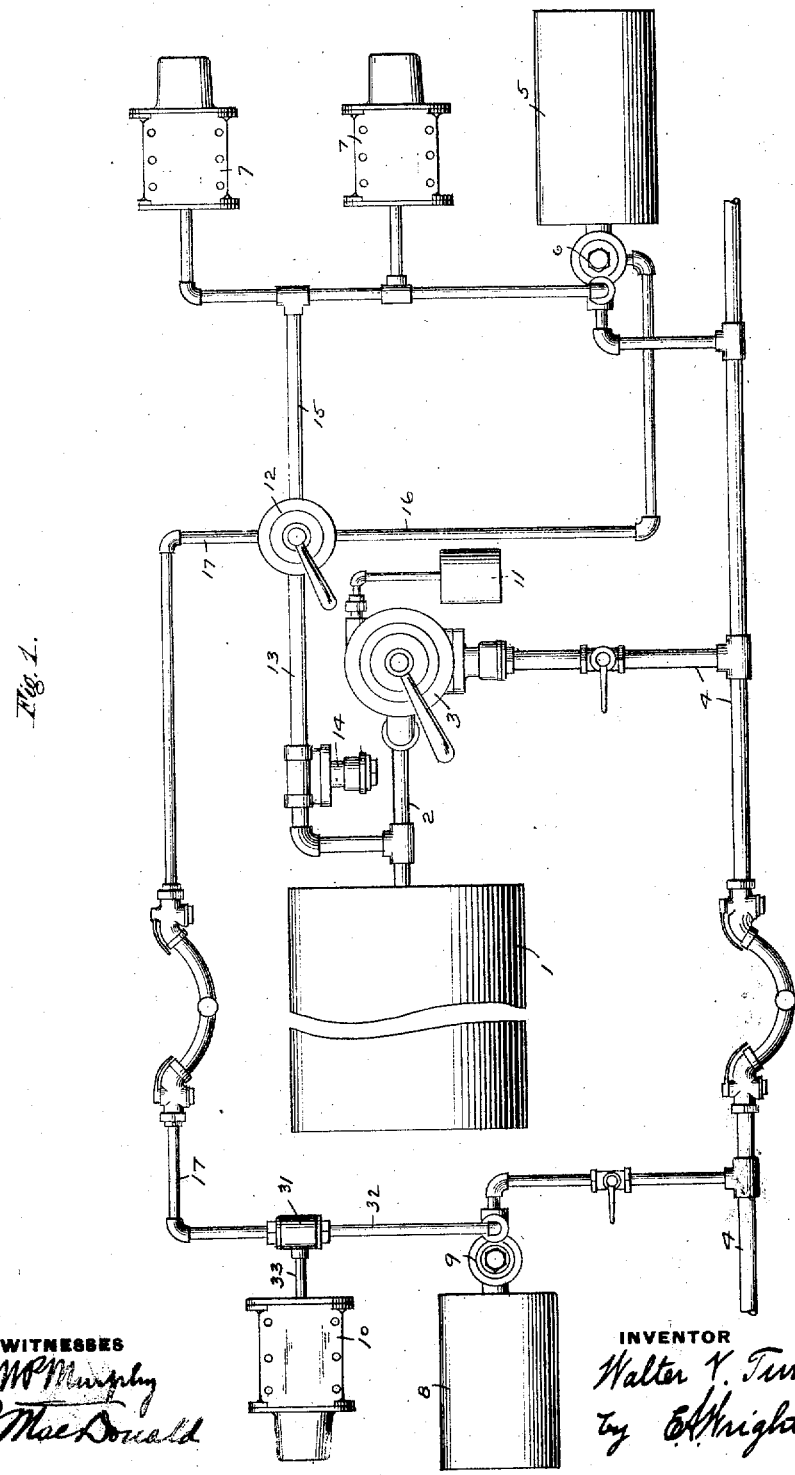

963,487.

Patented July 5, 1910.

3 SHEETS—SHEET 2.

Running Position
Release Engine & Tender

Release Position
Engine

Lap

Straight Air Application
Engine

Straight Air Application
Engine & Tender

WITNESSES
H. M. P. Murphy
J. B. MacDonald

INVENTOR
Walter V. Turner
by E. H. Wright
Att'y.

W. V. TURNER.
COMBINED AUTOMATIC AND STRAIGHT AIR BRAKE APPARATUS.
APPLICATION FILED SEPT. 18, 1906.

963,487.

Patented July 5, 1910.
3 SHEETS—SHEET 3.

WITNESSES
HMP Murphy
JB MacDonald

INVENTOR
Walter V. Turner
by E.H. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

COMBINED AUTOMATIC AND STRAIGHT-AIR BRAKE APPARATUS.

963,487.      Specification of Letters Patent.      Patented July 5, 1910.

Application filed September 18, 1906. Serial No. 335,086.

*To all whom it may concern:*

Be it known that I, WALTER V. TURNER, a citizen of the United States, residing at Edgewood, in the county of Allegheny and State of Pennsylvania, have invented new and useful Improvements in Combined Automatic and Straight-Air Brake Apparatus, of which the following is a specification.

This invention relates to fluid pressure brakes, and more particularly to that part of an automatic fluid pressure brake system adapted to be employed on the engine and tender of railway trains.

In the operation of trains as hauled by engine and tender, it is often desirable to control the engine or driver brakes independently of the automatic train brakes, and also sometimes independently of the tender brakes. It is also desirable, at certain times, to operate the engine and tender brakes simultaneously in applying and releasing, as when controlling the brakes by straight air alone, independent of the automatic train brakes.

The principal object of my invention is to provide an improved combined automatic and straight air brake apparatus, whereby these desirable results may be obtained.

Another object is to provide an improved form of double check valve device which may be used in a combined automatic and straight air brake equipment to give an independent control of the brakes by the respective systems.

Figure 5:
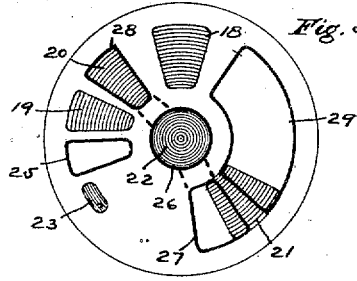
Figure 2:
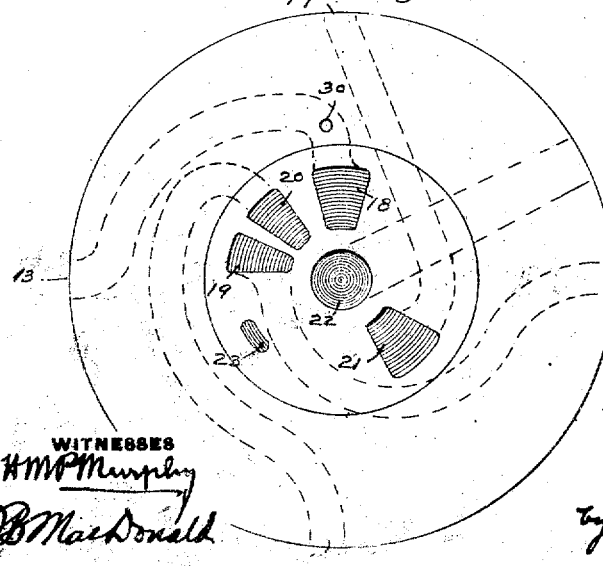
Figure 4:
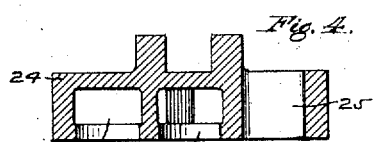
Figure 3:
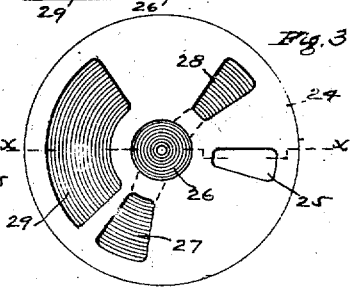

In the accompanying drawings, Figure 1 is a diagrammatic plan view illustrating a combined automatic and straight air brake apparatus for engine and tender embodying one form of my improvements; Fig. 2 a plan view of the seat of the independent or straight air brake valve; Fig. 3 a face view of the rotary valve; Fig. 4 a vertical section of the same taken on the line x—x of Fig. 3; Fig. 5 a diagram illustrating the running position of the independent brake valve, the ports of the valve seat being indicated by light lines and the ports in the rotary valve face by heavy lines; Figs. 6, 7, 8 and 9, similar diagrams illustrating the valve in the respective positions of "engine release", "lap", "straight air application engine", "straight air application engine and tender"; Fig. 10 a central section of my improved double check valve device; and Fig. 11 a diagrammatic view illustrating the standard combined automatic and straight air brake apparatus with which the improved double check valve device may also be employed.

Referring to the construction shown in Fig. 1, the equipment comprises the usual main reservoir 1, pipe 2, engineer's brake valve 3, equalizing reservoir 11, train brake pipe 4, auxiliary reservoir 5, triple valve 6, and brake cylinders 7 on the engine, and auxiliary reservoir 8, triple valve 9, and brake cylinder 10 on the tender, all of which corresponds with the customary standard automatic brake apparatus which is well understood in the art.

According to my improvement, an additional independent brake valve 12 is provided having a pipe connection 13 communicating with the main reservoir or source of supply, through a reducing valve 14, a pipe 15 leading directly to the engine brake cylinders 7, a pipe 16 connected to the exhaust port of the engine triple valve 6, and a pipe 17 communicating with the tender brake cylinder. These pipes, or passages, communicate with corresponding ports 18, 19, 20 and 21, respectively, in the valve seat, as shown in Fig. 2, while the central exhaust port 22 and small warning port 23 lead to the atmosphere.

The rotary valve 24 has a through port 25, a large exhaust cavity having a central opening 26 and two side openings 27 and 28 in the face of the valve, and another segmental cavity 29. The rotary valve may be balanced on its seat by fluid pressure admitted from the source of supply through a small port 30 to the chamber above the valve, as will be readily understood.

The exhaust from the tender brake may be independently controlled in various ways, but I prefer to employ my improved form of double check valve device 31 connected to the pipe 17 from the independent brake valve, the pipe 32 from the tender triple valve 9, and the pipe 33 leading to the brake cylinder 10. As shown in Fig. 10, this device comprises the small double faced valve 34 having opposite seats 35 and 36 for controlling communication from the respective pipes 17 and 32 to the pipe 33 and the brake cylinder. A piston 37, subject to pressure from pipe 17, is located in a bushing 38 and bears on the piston valve 39, which operates in bushing 40 and controls the outlet port 41 from the triple valve and pipe 32 to the atmosphere through passage 42. The piston valve 39 is of smaller diameter than piston 37 and is provided with a seat 43.

In the operation of this improved apparatus, the engineer's brake valve 3 is manipulated in the usual manner for controlling the automatic brake system on both engine and train, the independent brake valve being in the running position, as indicated in Fig. 5, in which the engine triple valve exhaust is open to the atmosphere through 16, 20, 28, 26 and 22, and the pipe 17 also communicates with the atmosphere through ports 21, 27, 26, and 22.

Figure 7:
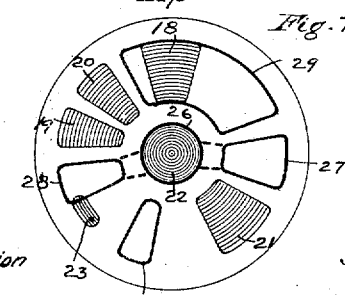
Figure 9:
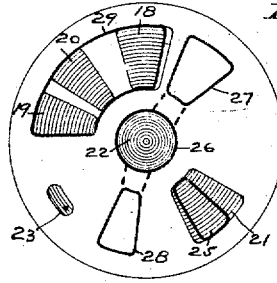
Figure 10:
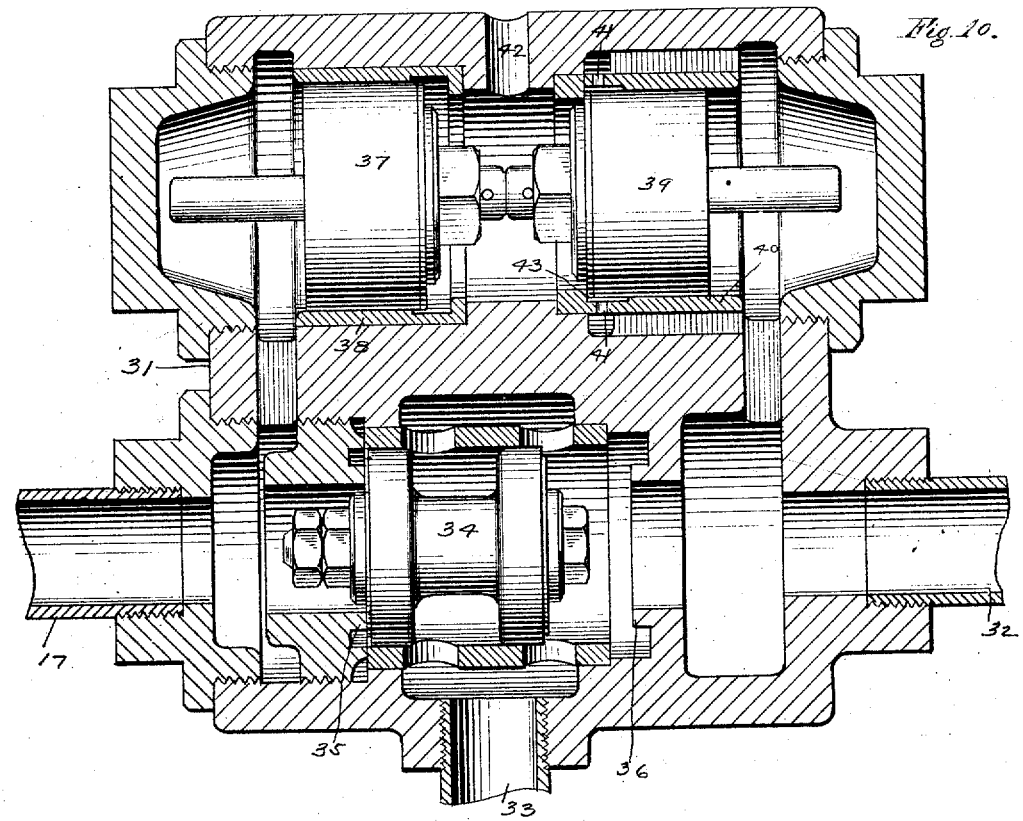

In order to operate the engine and tender brakes simultaneously by straight air when the automatic system is not in use, the independent brake valve may be turned to the application position, indicated in Fig. 9, in which air from the main reservoir is supplied to the engine brake cylinders through ports 18, 29 and 19, and to the tender brake cylinder through ports 25 and 21 and pipe 17. Lap position, with all ports closed, is shown in Fig. 7, and the brakes of the engine and tender may be applied, released, or graded up or down, by moving the independent brake valve through the positions indicated in Figs. 5, 7 and 9, as will be readily understood.

Figure 6:
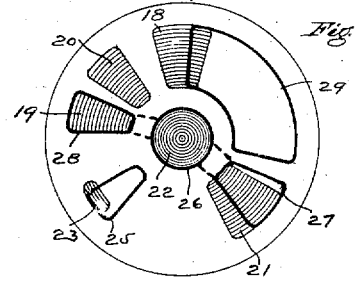

When the automatic brakes are applied on both engine, tender and train, it is often desirable to be able to release the engine brakes, in order to relieve the pressure on the tires of the driving wheels, and with my improvement this may readily be done by turning the independent brake valve to the engine release position, indicated in Fig. 6, in which the engine brake cylinders are released to the atmosphere through ports 19, 28, 26 and 22, while the train brakes are still held applied, as are also the tender brakes, since the double check valve is then seated to close the pipe 17. In this position, it will be noticed that the through port 25 registers with the warning port 23 to remind the engineer not to leave the handle in this position, for the reason that in case of an emergency application being required or made automatically, there would then be no brake application obtained on the engine with this port open to the atmosphere.

Figure 8:
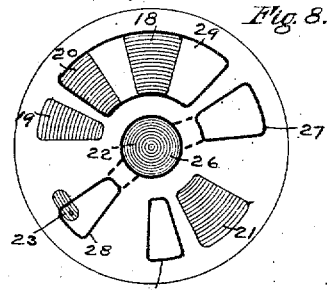

After the engine brake has thus been released, independently of the tender and train brakes, if it be desired to again apply said brake while recharging the tender and train auxiliary reservoirs, this may be done by placing the independent brake valve in the position shown in Fig. 8, and then turning the engineer's brake valve to release and running positions. As all the triple valves are then moved to release position by the customary increase in the train pipe pressure, the auxiliary reservoirs will all be recharged in the usual way, but at the same time the engine brake will be applied with straight-air flowing through ports 18, 29, 20, pipe 16 and triple valve exhaust port to the engine brake cylinders. This operates to check the speed and hold the train under control during the recharging of the automatic system. The automatic brakes may then be again applied and the engine brake released independently, as previously described. It is also possible to release both the engine and tender brakes independently of the train brakes and while the latter remain applied, if it should be desirable to do so, by first placing the independent brake valve in the application position, Fig. 9, whereby air under pressure from the source of supply passes through ports 25 and 21 and pipe 17 to the double check valve device, where it acts upon piston 37 to move the valve 39 to open vent ports 41 and release the air from the brake cylinder and the opposite side of the double check valve 34, permitting the valve to reverse. The independent brake valve is then turned to release position, Fig. 6, and both engine and tender brakes are released.

If the tender brake should be applied with straight air at the time that an automatic service application is made the tender triple valve will supply air from the auxiliary reservoir to the pipe 32, but as this pipe is closed by the check valve 34 and the ports 41 are open, this air will merely escape to the atmosphere and not enter the brake cylinder to increase the pressure therein. If, however, an emergency application is made at this time, the air pressure will build up on piston valve 39 much faster than it can escape at the small vent ports 41, consequently the pressure on the piston 39 exceeds that on piston 37 and the piston valve 39 moves to its seat, closing the vent ports 41. The pressure then accumulates very rapidly on the check valve 34, reversing its position and opening communication through pipe 33 to the brake cylinder. By this means the maximum braking pressure may always be obtained in the tender brake cylinder in emergency applications, while in service applications the braking pressure will not be increased above that already determined by the straight air application.

Figure 11:
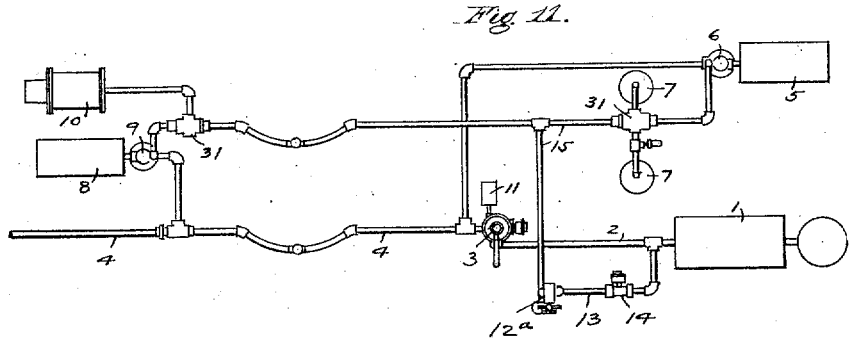

My improved form of double check valve device may also be used in the place of the standard double check valve in the combined automatic and straight air brake apparatus, as illustrated in Fig. 11, in which the old form of independent or straight air brake valve 12ª controls the direct supply of air to the pipe 15 leading to the double check valves 31 on both the engine and tender. By means of this construction, the release of the engine and tender brakes may be produced by the straight air brake valve independently of the automatic train brakes while the latter are applied, in the same manner as above described with reference to the tender brake, and the maximum braking pressure may always be obtained in the engine and tender brake cylinders in emergency applications, even if the straight air brake is applied. This feature of my invention is in the nature of an improvement on that covered in prior pending applications, Ser. No. 223,041 filed Sept. 1, 1904, according to which a piston subject to pressure from the straight air brake valve connection operates a vent valve on the opposite side of the double check valve.

According to the present improvement, the air supplied from the triple valve acts with a constantly increasing pressure on the piston 39 in emergency applications and insures the movement thereof to close the vent ports 41, since the full area of the piston is constantly exposed through a free open communication to the fluid supply from the triple valve.

Having now described my invention, what I claim as new and desire to secure by Letters Patent, is:—

1. In a fluid pressure brake, the combination with an automatic brake equipment for the engine and an automatic brake equipment for the tender, of an independent brake valve for releasing the engine brake independently of the tender brake while the brakes are automatically applied.

2. In a fluid pressure brake, the combination with an automatic brake equipment for the engine and an automatic brake equipment for the tender, a manually operated means for releasing the engine brake independently of the tender brake and of the position of the triple valve of the engine brake.

3. In a fluid pressure brake, the combination with an automatic brake equipment for the engine and an automatic brake equipment for the tender, of manually operated means for supplying fluid to the engine brake cylinder independently of the tender brake cylinder.

4. In a fluid pressure brake, the combination with an automatic brake equipment for the engine and an automatic brake equipment for the tender, of manually operated means for supplying fluid either to both engine and tender brakes simultaneously or to the engine brake independently of the tender brake.

5. In a fluid pressure brake, the combination with an automatic brake equipment for the engine and an automatic brake equipment for the tender, of an independent brake valve having ports for supplying fluid to both the engine and tender brakes in one position, and to the engine brake separately in another position.

6. In a fluid pressure brake, the combination with an engine brake cylinder and a tender brake cylinder, of a brake valve having separate connections to said brake cylinders, and ports for releasing the engine brake either simultaneously with or independently of the tender brake.

7. In a fluid pressure brake, the combination with an engine brake cylinder and a tender brake cylinder, of a brake valve having separate connections to said brake cylinders, and ports for supplying fluid to both said brake cylinders in one position, and to the engine brake cylinder separately in another position.

8. In a fluid pressure brake, the combination with an engine brake cylinder and a tender brake cylinder, of a brake valve having separate connections to said brake cylinders, and ports for operating the engine brakes either simultaneously with or independently of the tender brake.

9. In a fluid pressure brake, the combination with an automatic brake equipment for the engine and an automatic brake equipment for the tender, of an independent brake valve having separate ports communicating with the tender brake cylinder, the engine brake cylinder and the engine triple valve exhaust.

10. In a fluid pressure brake, the combination with a train pipe, auxiliary reservoir, triple valve, and brake cylinder, of an independent brake valve, a double check valve interposed between said brake valve, the triple valve and the brake cylinder, a piston valve device operated by direct pressure for opening a vent port on the triple valve side of the check valve, and a piston having constant free open communication with the triple valve supply for closing said vent port.

11. A double check valve device comprising a check valve having opposite seats, a valve controlling a vent port from one side of the check valve to the atmosphere, a piston operated by fluid pressure from the same side for closing said port, and a piston subject to the pressure on the opposite side of said check valve for opening said port.

12. A double check valve device comprising a check valve having opposite seats, a valve controlling a vent port from one side of said check valve, and a differential piston mechanism subject to pressures on opposite sides of said check valve for operating the vent valve.

13. In a fluid pressure brake, the combination with a train brake pipe; an engine brake cylinder and a tender brake cylinder, of a brake valve and separate pipes connecting the brake valve with the engine brake cylinder and the tender brake cylinder.

In testimony whereof I have hereunto set my hand.

WALTER V. TURNER.

Witnesses:
Geo. B. Snyder,
J. B. MacDonald.